United States Patent [19]
Hutchinson et al.

[11] 3,875,836
[45] Apr. 8, 1975

[54] SHEET CUTTER

[75] Inventors: Leslie Hutchinson; Christopher Jump, both of Manchester, England

[73] Assignee: Imperial Chemical Industries Limited, London, England

[22] Filed: Mar. 4, 1974

[21] Appl. No.: 447,828

[30] Foreign Application Priority Data
Apr. 2, 1973  United Kingdom............ 15703/73

[52] U.S. Cl. ............... 83/18; 83/37; 83/45; 83/47; 83/100; 83/302; 83/408
[51] Int. Cl. ....... B26d 1/56, B26d 7/14, B23d 25/02
[58] Field of Search ............ 83/18, 37, 45, 47, 100, 83/302, 408

[56] References Cited
UNITED STATES PATENTS
2,385,692  9/1945  Corbin et al. ............... 83/408 X
3,513,737  5/1970  Lindstad ............... 83/100
3,589,224  6/1971  Frantzen ............... 83/100
3,795,164  3/1974  Schneider ............... 83/100 X FOREIGN PATENTS OR APPLICATIONS
945,645  7/1956  Germany ............... 83/408

*Primary Examiner*—Willie G. Abercrombie
*Attorney, Agent, or Firm*—Cushman, Darby & Cushman

[57] ABSTRACT

A device and method for cutting light porous fragile sheet material, e.g. sheets of reconstituted tobacco or tobacco substitutes. The sheet is transported along a surface e.g. a roller, with traverse grooves across which it is sucked to hold it in tension during cutting e.g. by longitudinal cutters on a second roller. If desired the sheet can also be cut along its direction of transportation, e.g. by cutting discs.

11 Claims, 5 Drawing Figures

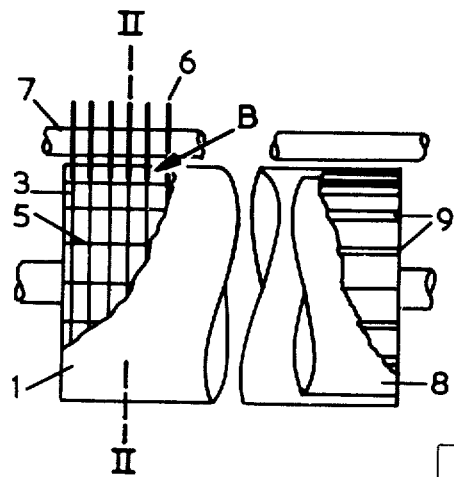
FIG (i)
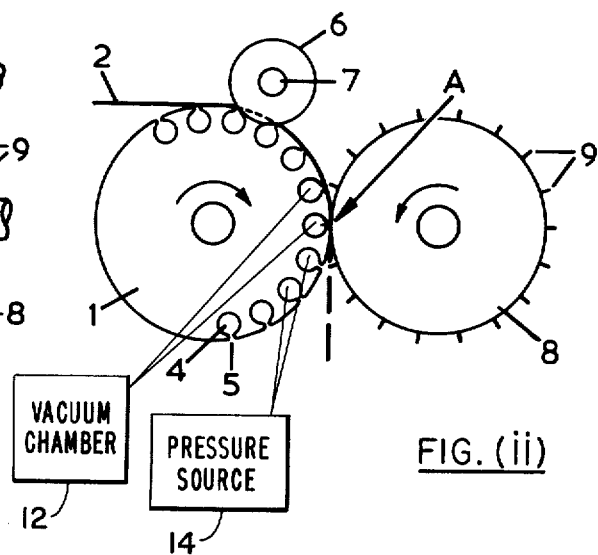
FIG. (ii)
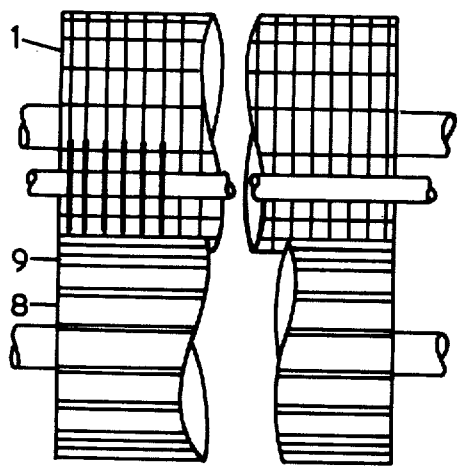
FIG (iii)
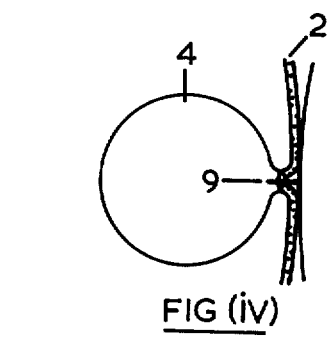
FIG (iv)
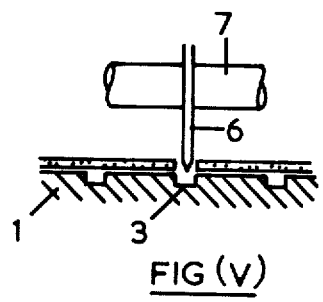
FIG (v)

SHEET CUTTER

This invention relates to a device for continuously cutting sheet material.

The expression "cutting" herein means either a cutting right through the thickness of the sheet to divide the material into pieces, or a partial cutting such as a perforation or indentation so that the material, though not completely divided by the cut may thereafter be readily broken or torn into pieces.

Known devices for continuously cutting sheet material, especially at rapid rates, generally prove unsuitable for use with material which is light in weight and/or fragile.

According to the invention a device for continuously cutting sheet material comprises a transporting surface grooved transversely to its direction of motion, means for sucking transported sheet material partially into said grooves, whereby to increase its tension across the grooves, and cutting means to engage sheet material as it is so tensioned.

Suitably the transporting surface may be a roller having longitudinal grooves.

Conveniently each groove may be formed as a conduit, for example of circular cross section, with a lengthwise slot opening the conduit to the transporting surface.

Advantageously the cutting means may be longitudinal cutters outwardly disposed on a second roller. The cutters may be adapted to perform a complete cut or an indentation. If perforation is required spiked or toothed cutters can be employed. The second roller and its cutters must be so mounted and dimensioned that during rotation each cutter engages with a transverse groove in the transporting surface. When the transporting surface is a roller the two rollers may be geared together for rotation at appropriate relative speeds.

If desired, cutting may be arranged along each successive transverse groove, but it is sometimes advantageous not to cut along every groove, thus leaving a suction to hold the material in place while cutting occurs.

The device of the invention may further comprise means for continuously cutting the sheet material along its direction of transportation, to intersect the transverse cuts and so divide the material into smaller pieces.

As desired the device may be so arranged that cutting along the direction of transportation either precedes or follows the aforementioned transverse cutting. Preferably however the cutting along the direction of transportation should precede the transverse cutting.

For cutting the sheet material along its direction of transportation a series of rotatably mounted cutting discs e.g. knife-edged or toothed or spiked discs may be used. It is convenient for the transporting surface to carry a series of grooves each parallel to the direction of transport, the cutting discs acting upon the sheet where it lies over the grooves.

A specific embodiment of the invention will now be described with the aid of the accompanying drawings in which FIG. (i) is an end view
FIG. (ii) is a section on the line II—II'
FIG. (iii) is a plan view
FIG. (iv) is an enlarged detail at the region A in FIG. (ii), and
FIG. (v) is an enlarged detail at the region B in FIG. (i).

A roller 1 is provided with driving means (not shown) for rotation in the direction shown to carry sheet material 2 over a portion of its outer surface. The outer surface of roller 1 is indented by a series of circumferential grooves 3. A series of longitudinal grooves is formed by conduits 4 disposed close to the outer surface of the roller, each conduit being open to the exterior by a longitudinal slot 5 in the surface. Thus the roller has an outward chequerboard appearance presented by the circumferential grooves 3 and the longitudinal slots 5 intersecting the grooves.

The conduits 4 are closed at one end but open at the other. At the open end the conduits 4 during rotation of the roller 1 come into register with a curved slot in an adjoining vacuum chamber (shown schematically at 12 in FIG. (ii)) becoming thus temporarily connected to the chamber, so that sheet material lying over the vacuum-connected conduits is sucked inwardly and thereby tensioned across the slots 5.

A series of cutting discs 6 is mounted on a driven shaft 7 to engage and cut the sheet material directly over the circumferential grooves 3.

A second roller 8 is mounted for rotation about a parallel axis and geared to 1 so as to be driven at the same pitch-line rate. This roller 8 bears a series of longitudinally positioned cutting knives 9. The two rollers are in register so that upon rotation each knife 9 slightly penetrates a slot 5 to cut the sheet material as it is tensioned across the slot.

Other means may be adopted for applying vacuum and pressure to the conduits, and vacuum and pressure may be applied to appropriate regions at each end of the conduits.

In the embodiment shown in the drawings the device is adapted to cut sheet material into separate pieces by first slicing it into strips and then cutting across the strips as they are held in position on the transporting roller 1 by suction applied from underneath, being also tensioned at the cutting positions by the suction so that the action of the cutting blades is more effective. In a variant of the embodiment described above there may be more circumferential grooves 3 than cutting discs 6. The extra grooves assist in keeping the material on the surface during transverse cutting.

By appropriate adjustment of the cutting discs 6 and the blades 9 a partial cutting can be made to result in indentation For complete cutting or indentation, seration or other variation of the cutting edges may sometimes be advantageous.

If perforation is required instead of complete cutting the discs 6 and the blades 9 may be spiked or toothed.

Certain sheet material may tend to adhere to the roller after cutting. To assist its release a pressurised air-chamber (shown schematically at 14 in FIG. (ii)) may be positioned at the end of the roller 1 in similar manner to the vacuum chamber and connected to passing conduits by a curved slot so that the cut material is blown off the roller.

The device is particularly useful for cutting light, porous and relatively fragile sheet material for example sheets of reconstituted tobacco or tobacco substitute. More particularly it is valuable for cutting material containing large amounts of inorganic matter. This, in addition to increasing the fragility of the sheet, has an abrasive effect on cutting edges tending to blunt them when metal-to-metal contact is involved as for example in a scissor-like action. In particular the device is valuable for cutting sheets of tobacco substitute containing from 40 to 65 percent of inorganic filler, such as are described for example in UK Pat. No. 1,299,296.

It is an advantage of the invention that metal-to-metal cutting action is avoided and that fragments of material may readily be removed from the cutting regions. Referring to the drawings fragments may be removed from the circumferential grooves by means of combs, and the suction applied to the longitudinal conduits is effective in keeping the slots free of loose fragments.

We claim:

1. A device for continuously cutting sheet material comprising
   a. transporting means providing a surface movable to transport said sheet material in a given direction, said transporting surface having a plurality of grooves transverse to said given direction,
   b. means for increasing the tension of said sheet across said grooves by sucking said sheet partially into said grooves, said means including conduit means connected to said grooves and adapted to be connected to a vacuum, and
   c. cutting means for engaging said sheet material within said grooves when said sheet material is tensioned by said tension increasing means.

2. A device as recited in claim 1 further comprising
   d. means for blowing said sheet material off said transporting means after cutting of said sheet material, said means including a source of fluid under pressure adapted to be connected to said conduit means connected to said grooves.

3. A device as recited in claim 2 further comprising
   e. means for continuously cutting said sheet material along its direction of transportation to intersect transverse cuts and so further divide said material.

4. A device according to claim 1 wherein the transporting means is a roller having longitudinal grooves.

5. A device according to claim 4 wherein the cutting means comprise longitudinal cutters outwardly disposed on a second roller mounted and dimensioned so that during rotation each cutter engages with a longitudinal groove in the transporting roller.

6. A device according to claim 1 further comprising means for continuously cutting the sheet material along its direction of transportation to intersect transverse cuts and so further divide the material.

7. A device according to claim 6 wherein the means for continuously cutting the sheet material along its direction of transportation comprises a series of rotatably mounted cutting discs.

8. A device according to claim 7 wherein the transporting surface carries a series of grooves each parallel to the direction of transport, the cutting discs being mounted to act upon the sheet where it lies over the grooves.

9. A method of continuously cutting light, porous, fragile sheet material such as a tobacco substitute sheet, said method comprising the steps of
   a. transporting said sheet in a given direction via a movable transporting surface having grooves therein disposed transversly to said given direction,
   b. tensioning said sheet across said grooves by applying a vacuum to said grooves to partially suck said sheet into said grooves, and
   c. cutting said sheet within said grooves while said sheet is so tensioned.

10. A method as recited in claim 9 comprising the further step of
    d. repelling said sheet from said transporting surface after cutting of said sheet by applying fluid under pressure to said grooves.

11. A method as recited in claim 10 comprising the further step of
    e. continuously cutting said sheet along its direction of transportation to intersect said transverse cuts and so further divide said sheet.

* * * * *